United States Patent
McDuff et al.

(10) Patent No.: US 7,600,956 B2
(45) Date of Patent: Oct. 13, 2009

(54) PLASTIC ANCHOR FOR DRYWALL, PLASTER, BRICK AND CONCRETE

(75) Inventors: Pierre McDuff, Outremont (CA);
Alexandre Pollak, Laval (CA); Lang Nguyen, Dollard-des-Ormeaux (CA);
William A. Crossley, Goshen, NY (US)

(73) Assignee: Cobra Anchors Co. Ltd. (CA)

( * ) Notice: Subject to any disclaimer, the term of this patent is extended or adjusted under 35 U.S.C. 154(b) by 71 days.

(21) Appl. No.: 11/385,975

(22) Filed: Mar. 21, 2006

(65) Prior Publication Data

US 2007/0166122 A1     Jul. 19, 2007

Related U.S. Application Data

(60) Provisional application No. 60/759,045, filed on Jan. 17, 2006.

(51) Int. Cl.
*F16B 13/06*     (2006.01)
(52) U.S. Cl. .................. 411/80.1; 411/60.1; 411/32; 411/342
(58) Field of Classification Search .................. 411/40, 411/60.1–60.3, 32, 80.1–80.6, 341, 342, 411/182
See application file for complete search history.

(56) References Cited

U.S. PATENT DOCUMENTS

| | | | |
|---|---|---|---|
| 1,878,600 A | 9/1932 | Pleister | |
| 3,171,321 A | 3/1965 | Fischer | |
| 3,516,324 A * | 6/1970 | Berner | 411/72 |
| 3,974,735 A | 8/1976 | Berner | |
| 4,088,054 A | 5/1978 | Lippacher et al. | |
| 4,142,440 A | 3/1979 | Schefer | |
| 4,182,217 A | 1/1980 | Runge | |
| 4,284,378 A * | 8/1981 | Mizusawa | 411/21 |
| 4,312,612 A * | 1/1982 | Thompson | 411/15 |
| 4,407,618 A * | 10/1983 | Kimura | 411/40 |
| 4,666,354 A * | 5/1987 | Hepworth | 411/40 |
| 4,770,583 A * | 9/1988 | Lindberg | 411/340 |
| 5,288,189 A * | 2/1994 | Hepworth | 411/32 |
| 5,425,609 A * | 6/1995 | Smith | 411/344 |
| 5,716,177 A | 2/1998 | Schaffer | |
| 5,833,415 A | 11/1998 | McSherry | |
| 6,250,865 B1 | 6/2001 | Mcsherry | |

(Continued)

FOREIGN PATENT DOCUMENTS

DE     41 09 120 A1     9/1992

(Continued)

*Primary Examiner*—Flemming Saether
(74) *Attorney, Agent, or Firm*—Novak Druce + Quigg

(57) ABSTRACT

An anchoring device for insertion in a hole provided in a structure such as a wall (hollow or solid) comprises proximal and distal sections. The proximal section includes a head defining an aperture for receiving a fastener, and the distal section includes a pair of expandable wings displaceable between collapsed and expanded positions. Each wing is biased towards its expanded position such that the wings can engage the structural material delimiting the hole or a distal surface of the structure. The distal section comprises, proximally of the wings, a variable-length flexible portion for allowing the wings to engage the distal surface of the structure for various structure thicknesses. The distal section comprises, distally of the wings, a tip section adapted to spread outwardly when engaged by the fastener. The proximal section comprises a pair of legs each having a toothed rack for engaging the structural material.

13 Claims, 15 Drawing Sheets

U.S. PATENT DOCUMENTS 7,014,405 B2 * 3/2006 Behle et al. .................. 411/21

FOREIGN PATENT DOCUMENTS

| | | | |
|---|---|---|---|
| FR | 2 470 279 | A1 | 5/1981 |
| GB | 1 506 979 | | 4/1978 |
| GB | 2 016 106 | A | 9/1979 |
| GB | 2 289 101 | A | 11/1995 |

* cited by examiner

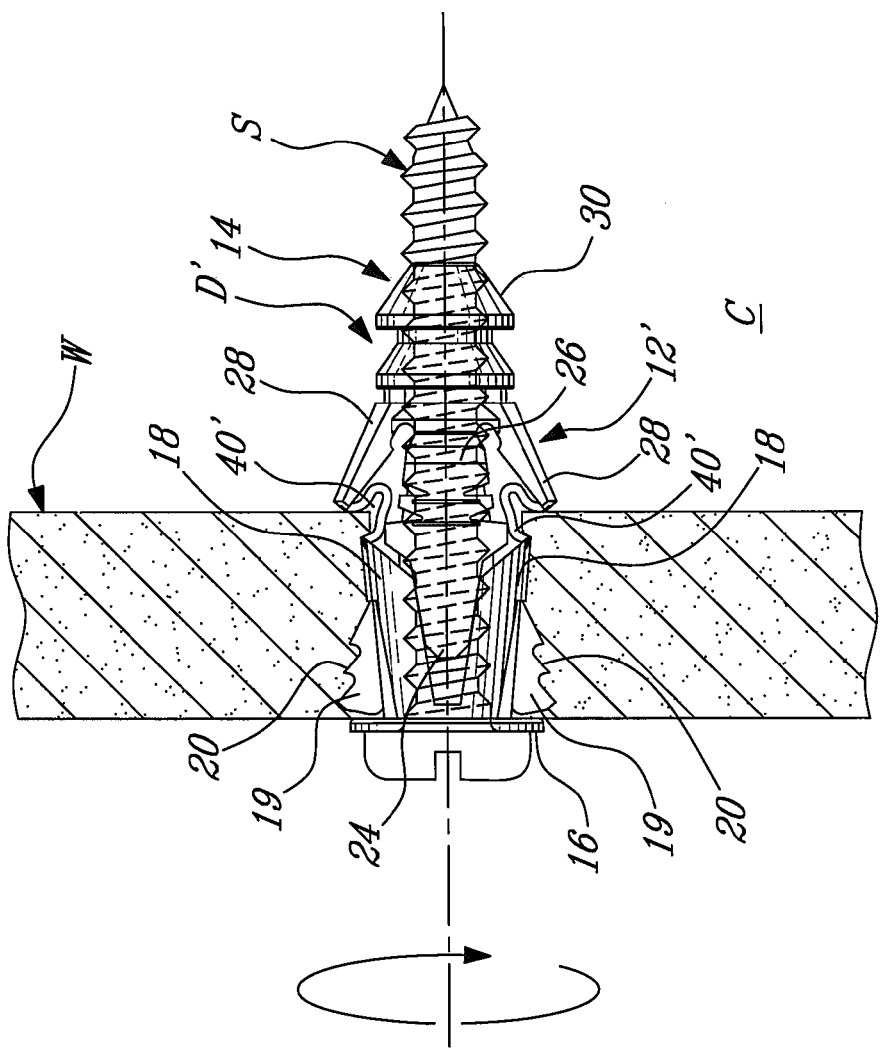

PLASTIC ANCHOR FOR DRYWALL, PLASTER, BRICK AND CONCRETE

CROSS REFERENCE TO RELATED APPLICATIONS

This Application claims priority on U.S. Provisional Application No. 60/759,045, filed on Jan. 17, 2006, which is herein incorporated by reference.

FIELD OF THE INVENTION

The present invention relates to wall anchors and, more particularly, to anchors suitable for both hollow and solid walls.

BACKGROUND OF THE INVENTION

Various wall anchors exist for hollow walls, including self-installable anchors and expandable anchors. Some of these anchors define outer threads adapted to engage the friable material that constitutes part of the wall structure, such as in U.S. Pat. No. 5,833,415 issued on Nov. 10, 1998 to McSherry. Other such anchors include a toggle member that is adapted to pivot between a longitudinal insertion position and a transversal retention position, wherein the toggle member adopts its transversal position once behind the wall, so as to then be drawn towards the wall until it engages a rear hidden surface of the hollow wall, thereby firmly securing the anchor to the hollow wall, such as in U.S. Pat. No. 6,250,865 issued on Jun. 26, 2001 to McSherry.

Anchoring devices encounter various wall mediums, such as hollow walls and solid walls, and in the case of the former, the thickness of the hollow wall may vary. Anchoring devices thus need to have constructions suitable for such mediums.

The present invention seeks to meet these needs and other needs.

SUMMARY OF THE INVENTION

More specifically, it is therefore an aim of the present invention to provide a novel anchoring device.

It is also an aim of the present invention to provide an anchoring device adapted for various wall constructions, including hollow walls of various wall thicknesses.

It is a further aim of the present invention to provide an anchoring device adapted for various wall constructions, such as hollow walls and solid walls.

It is still a further aim of the present invention to provide an anchoring device, typically made of plastic, adapted for retention in various materials, such as drywall, plaster, brick, concrete, etc.

More specifically, in accordance with the present invention, there is provided an anchoring device for insertion in a hole provided in a structure, comprising proximal and distal sections, said proximal section comprising a head defining an aperture for receiving a fastener, said distal section comprising at least one expandable wing displaceable between inwardly collapsed and outwardly expanded positions, said wing being biased towards said expanded position such that said wing is adapted to at least one of engaging structural material delimiting the hole and engaging a distal surface of the structure.

Also in accordance with the present invention, there is provided an anchoring device for insertion in a hole provided in a structure, comprising proximal and distal sections, said proximal section comprising a head defining an aperture for receiving a fastener, said proximal section comprising at least one leg, said distal section comprising a spreading member, said distal and proximal sections being displaceable towards one another such that said spreading member causes said leg to displace outwardly into engagement with the structural material delimiting the hole.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIGS. 7a to 7h are schematic successive partly cross-sectional side views showing the installation of the second anchoring device of FIG. 6 into a wall, wherein in FIG. 7f the anchoring device is shown rotated 90° with respect to its position in the other views.

DESCRIPTION OF ILLUSTRATIVE EMBODIMENTS

The present invention is illustrated in further details by the following non-limiting examples.

Figure 1:
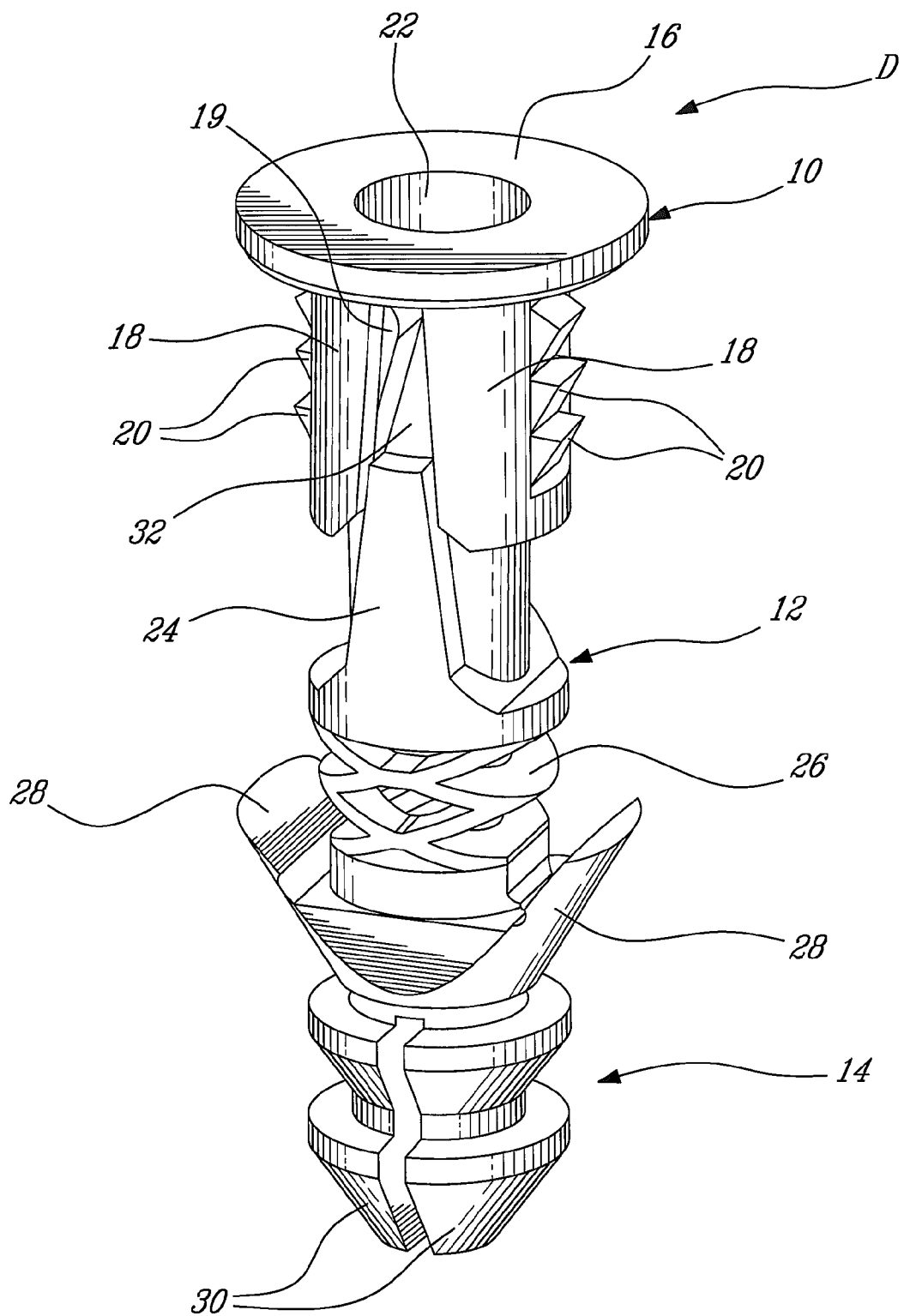
FIGS. 1 and 2 are perspective views of a first anchoring device in accordance with the present invention.
Figure 2:
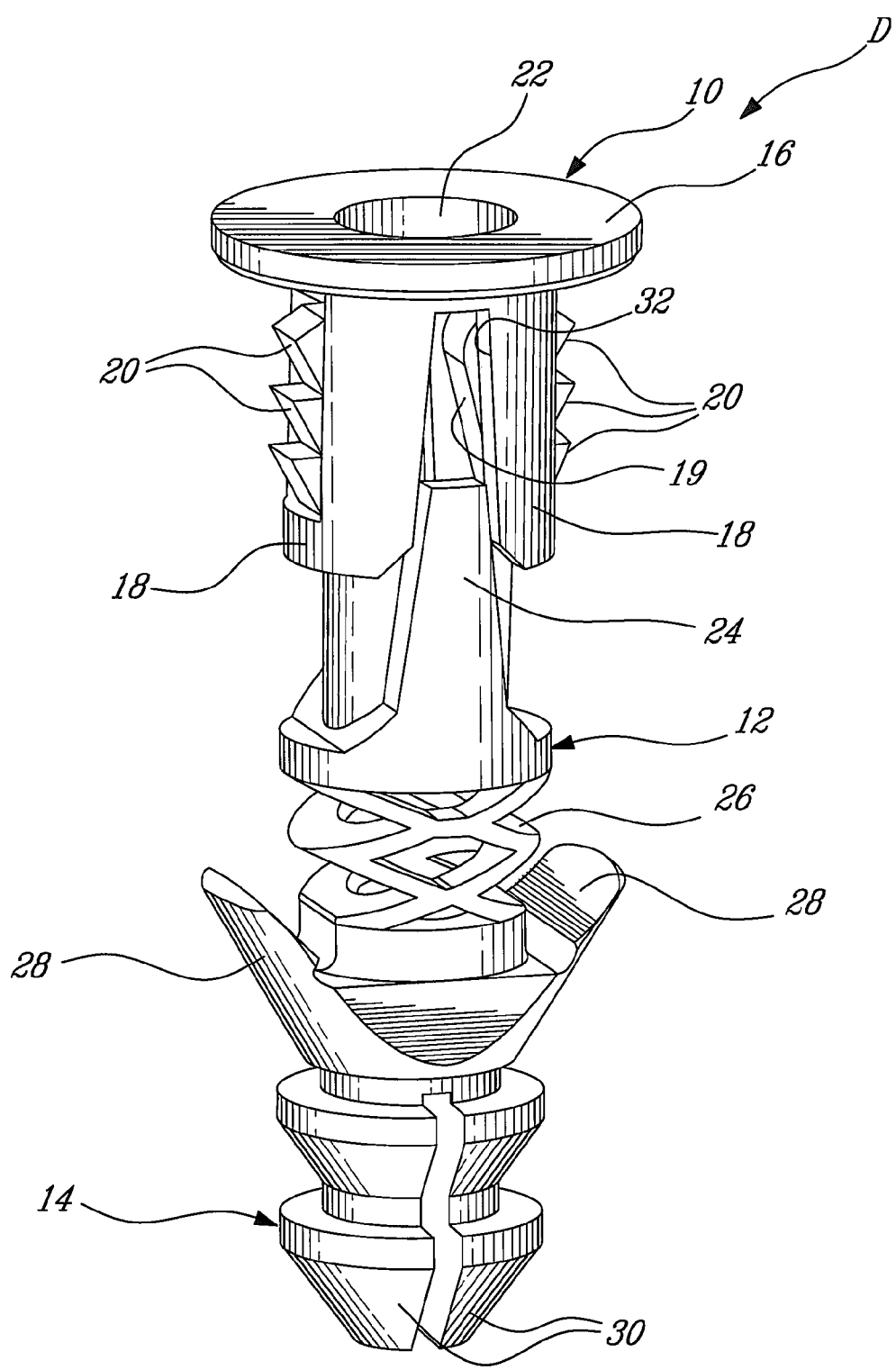

In accordance with the present invention, FIGS. 1 and 2 show an anchoring device, generally denoted hereinafter by the reference D.

The anchoring device D includes a proximal head section 10, an intermediate stem section 12, and a distal tip section 14. Typically, the anchoring device D is made of a plastic material, and is suitable for various hollow and solid walls, including wall of various thicknesses.

Figure 4:
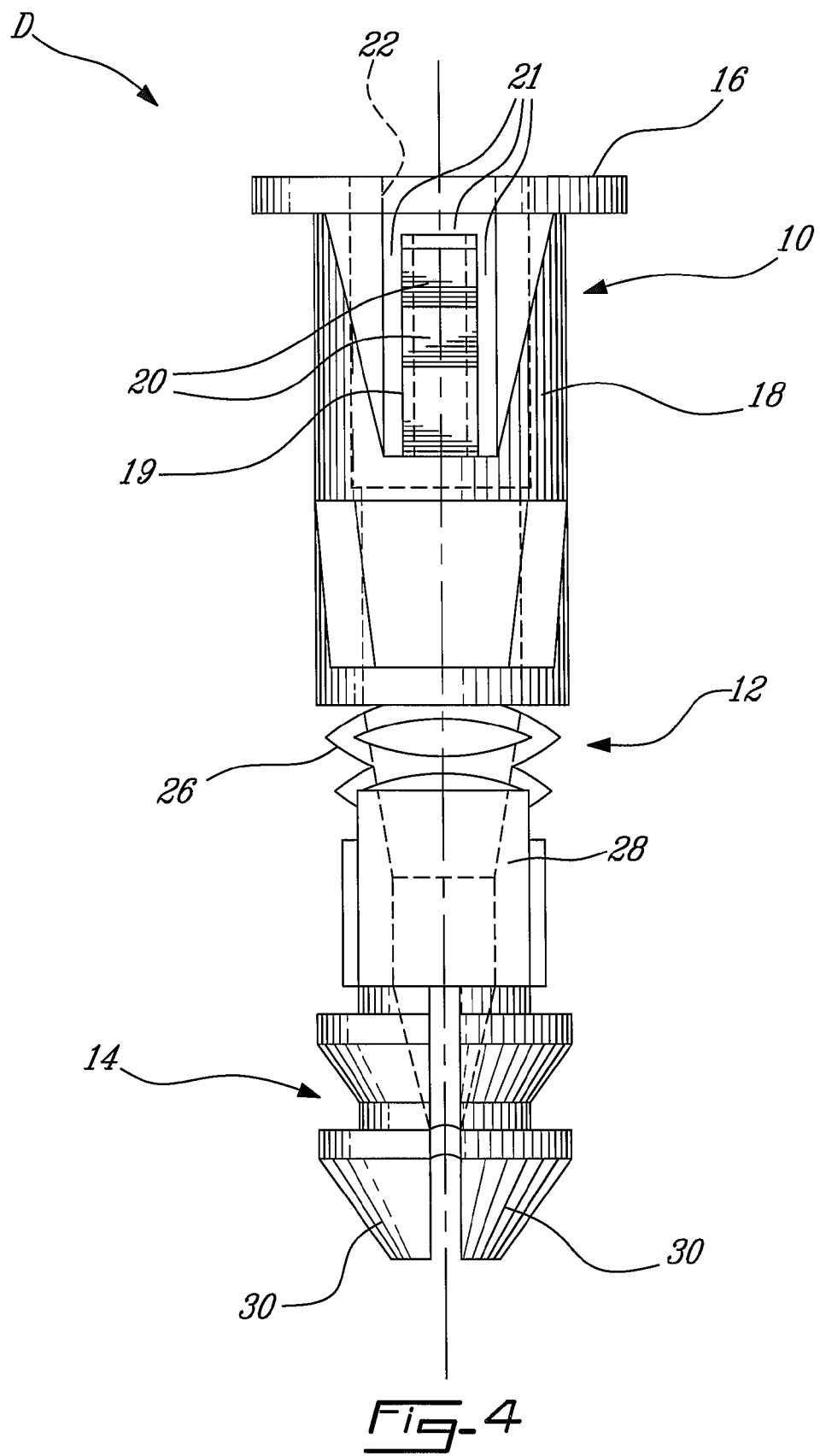
Figure 5:
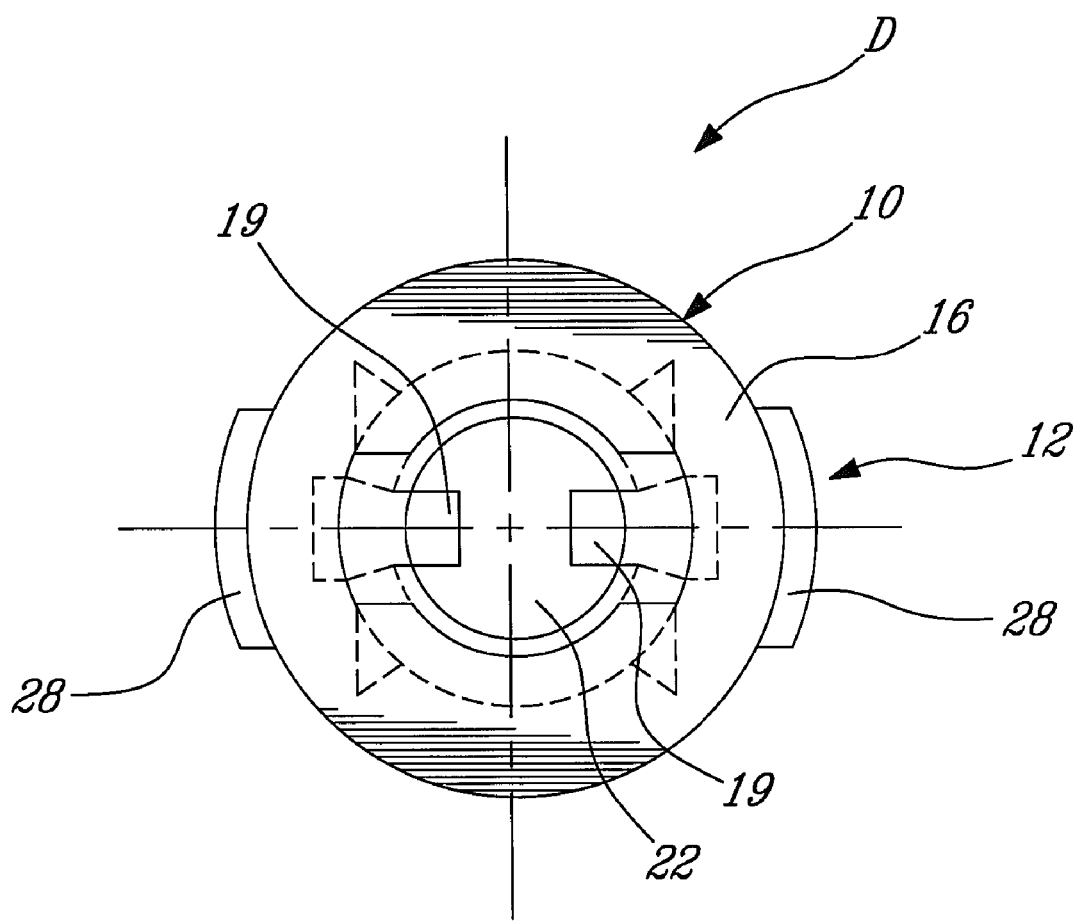
FIG. 5 is a top plan view of the first anchoring device of FIGS. 1 and 2.

The head section 10 comprises a flanged proximal end 16 adapted to abut a visible side of the wall (or other structure into which the anchoring device D is intended to be installed), and defines two opposed legs 18 extending symmetrically and distally from the flanged end 16. Each leg 18 includes a rack 19 that defines a set of angled teeth 20 that are aligned parallelly to a longitudinal axis of the anchoring device D. Each rack 19 is pivotally mounted at a lower end thereof to the remainder of the leg 18 with an inverted "U"-shaped gap 21 (see FIG. 4) being defined around the rack 19 such that the leg 19 can pivot, at its lower end, relative to the remainder of the leg 18.

The head section 10 also defines a central axial aperture 22 adapted to receive therethrough a fastener, such as a screw. The legs 18 and more particularly the teeth 20 are adapted to engage the wall material delimiting a hole that has been pre-formed, e.g. with a drill, in the wall. When the fastener, e.g. screw, is thereafter rotatably inserted in the anchoring device D already positioned in the wall's pre-drilled hole, the teeth 20 prevent the anchoring device D from rotating with respect to the wall. Furthermore, the fastener, as it is inserted in the anchoring device D, forceably spreads the two legs 18 radially outwardly (the legs 18 pivoting relative to their lower ends attached to the remainder of the legs 18) such that the teeth 20 engage the wall material, thereby substantially locking the anchoring device D in place and thus preventing the same from easily spinning within the hole defined in the wall.

The stem section 12 includes basically three portions, namely a proximal cam or wedge portion 24, an intermediate flexible portion 26 capable of limited extension and retraction along a longitudinal axis of the stem 12, and a pair of opposed distal wings 28 that are angled and biased towards a radially expanded position. The flexible portion 26 acts like a substantially strong spring for allowing the anchoring device D to assume various overall lengths and thus adapt itself to hollow walls of various thicknesses.

More particularly, the pair of wings 28 are designed, in the case of hollow walls, to extend behind the wall and to engage the hidden surface thereof outwardly of the pre-drilled hole, thereby increasing significantly the pull-out force required to remove the anchoring device D from the wall. When the anchoring device D is used in a solid wall, the wings 28 remain collapsed within the pre-drilled hole and, in view of their outward bias, engage the wall material around the pre-drilled hole.

Returning to the flexible portion 26 of the stem section 12, it will be understood that for use in hollow walls, it can be designed in various ways. For instance, the flexible portion 26 is like a spring that is biased towards a retracted position. Typically the spring force is greater than a friction force between the retracted wings 28 and the wall material defining the pre-drilled hole. Therefore, when the anchoring device D is inserted in the pre-drilled hole, the friction between the wings 28 and the wall material will not cause the flexible portion 26 to contract, whereby the wings 28 will have reached, by the time the anchoring device D has been fully inserted in the pre-drilled hole, the space behind the hollow wall.

Figure 3:
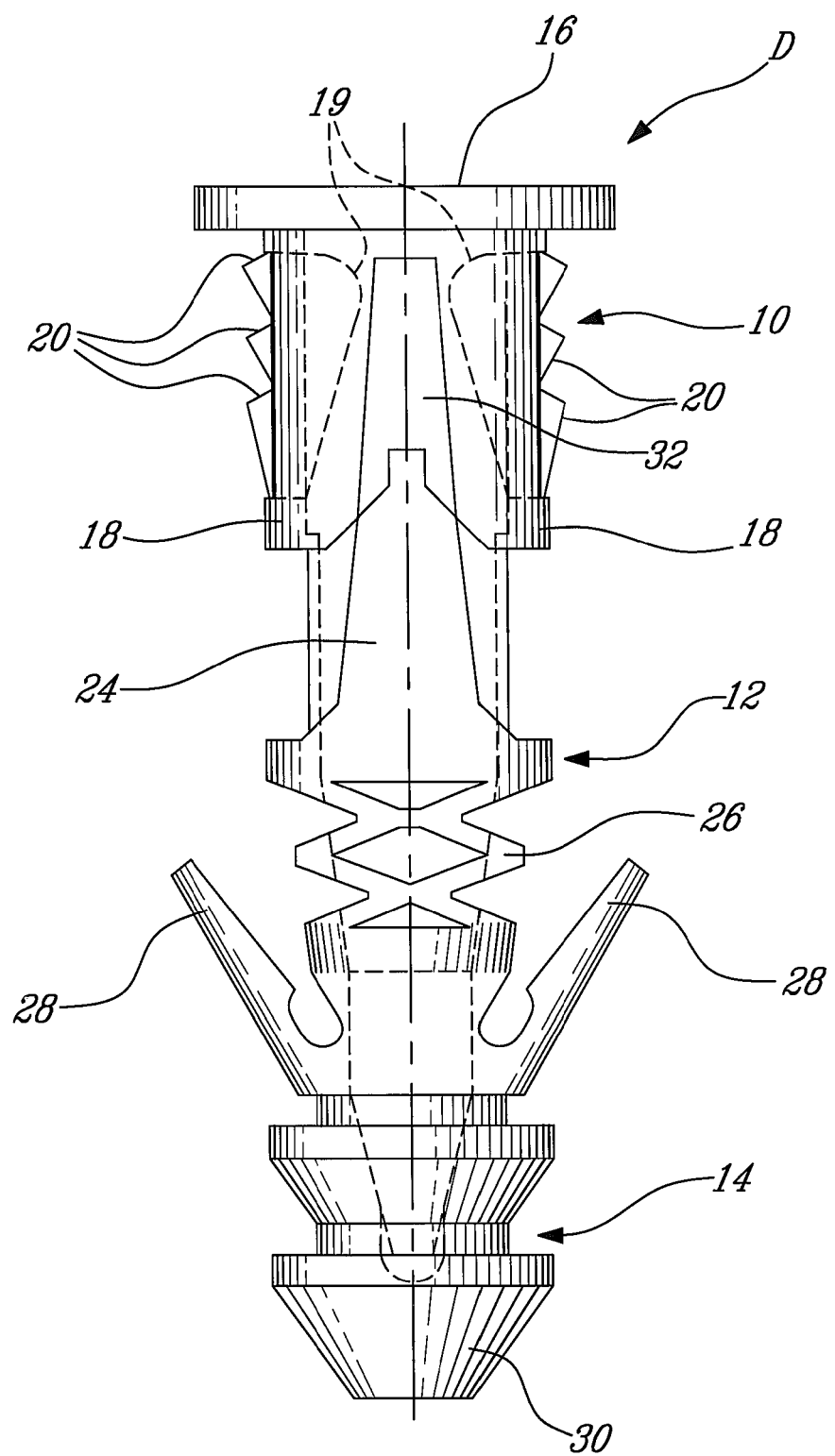
FIG. 3 and 4 are respectively front and side elevational views of the first anchoring device of FIGS. 1 and 2.

The wings 28 then, under their bias, expand to their position shown in FIGS. 1 to 3, such as to engage the hidden surface of the hollow wall, or such as to engage this hidden surface upon a slight attempt of withdrawing the anchoring device D from the wall, thereby greatly resisting a further withdrawal thereof from the wall.

With the anchoring device D being securely inserted in the pre-drilled hole, the fastener can then be inserted in the anchoring device D, via the aperture 22.

The tip section 14 includes a pair of symmetrical tips 30 adapted to expand, i.e. to spread away from one another, in hollow as well as in solid situations at the final stage of insertion of the fastener (screw). In the case of hollow walls, the spread tips 30 add to the pull-out force required to rip the installed anchoring device D from the wall. In solid walls, the tips 30, when spread outwardly, engage the wall material delimiting the pre-drilled hole thereby further retaining the anchoring device D in the wall.

In cases where the anchoring device D is used in solid walls, the wedge portion 24 of the stem section 12 may displace towards the flanged end 16 of the head section 10, thereby engaging further within slots 32 defined between the legs 18, on both sides of the head section 10. Once the wedge portion 24 engages the legs 18, the flared shape of the wedge portion 24 forces the legs 18 to expand outwardly, which thus wedge into the solid wall.

Therefore, the anchoring device D of the present invention, which is mounted within a pre-made hole and which is typically made of a plastics material, can be used in hollow walls and in solid walls. The anchoring device D includes various wall-engaging features for firmly anchoring it in various wall constructions, such features including the spreadable legs 18 and the teeth 20 thereof provided in the head section 10, the expandable wings 28 of the stem section 12, and the spreadable tips 30 of the tip section 14, which wall-engaging features being independent from each other and being used singularly or in any combinations thereof embodied in various non-illustrated variants of the anchoring device D. The anchoring device D also comprises an axially spring-like member, namely the flexible portion 26, for allowing the anchoring device D to adapt to various hollow wall thicknesses, specifically so that the wings 28 can engage the hidden surfaces of such hollow walls.

Figure 6:
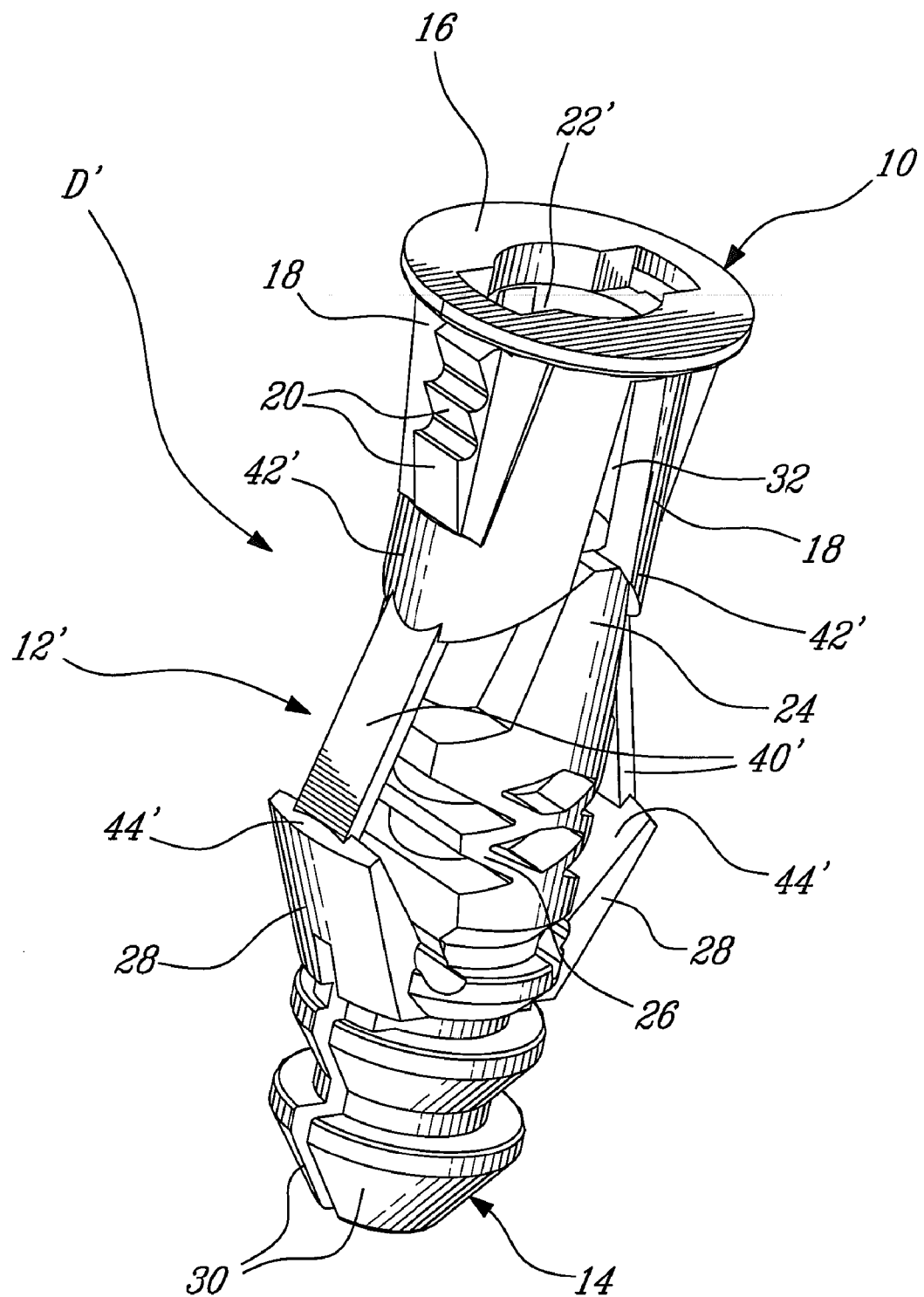
FIG. 6 is a perspective view of a second anchoring device in accordance with the present invention.

FIG. 6 illustrates another anchoring device D' in accordance with the present invention, which is generally similar to the anchoring device D of FIGS. 1 to 5. However, the anchoring device D' of FIG. 6 further includes a pair of retainer arms 40' each extending between a respective distal end 42' of leg 18 of the head section 10 and a proximal end 44' of a wing 28 of the stem section 12. The retainer arms 40' are in fact attached to these distal ends 42' and proximal ends 44' thereby significantly reinforcing the two wings 28, compared to those of the anchoring device D of FIGS. 1 to 5, so as to increase, in solid wall situations, the tension in the wings 28 and thus frictional forces between the wings 28 and the wall material defining the pre-drilled hole, and to increase the tension and shear in hollow wall situations.

Figure 7A:
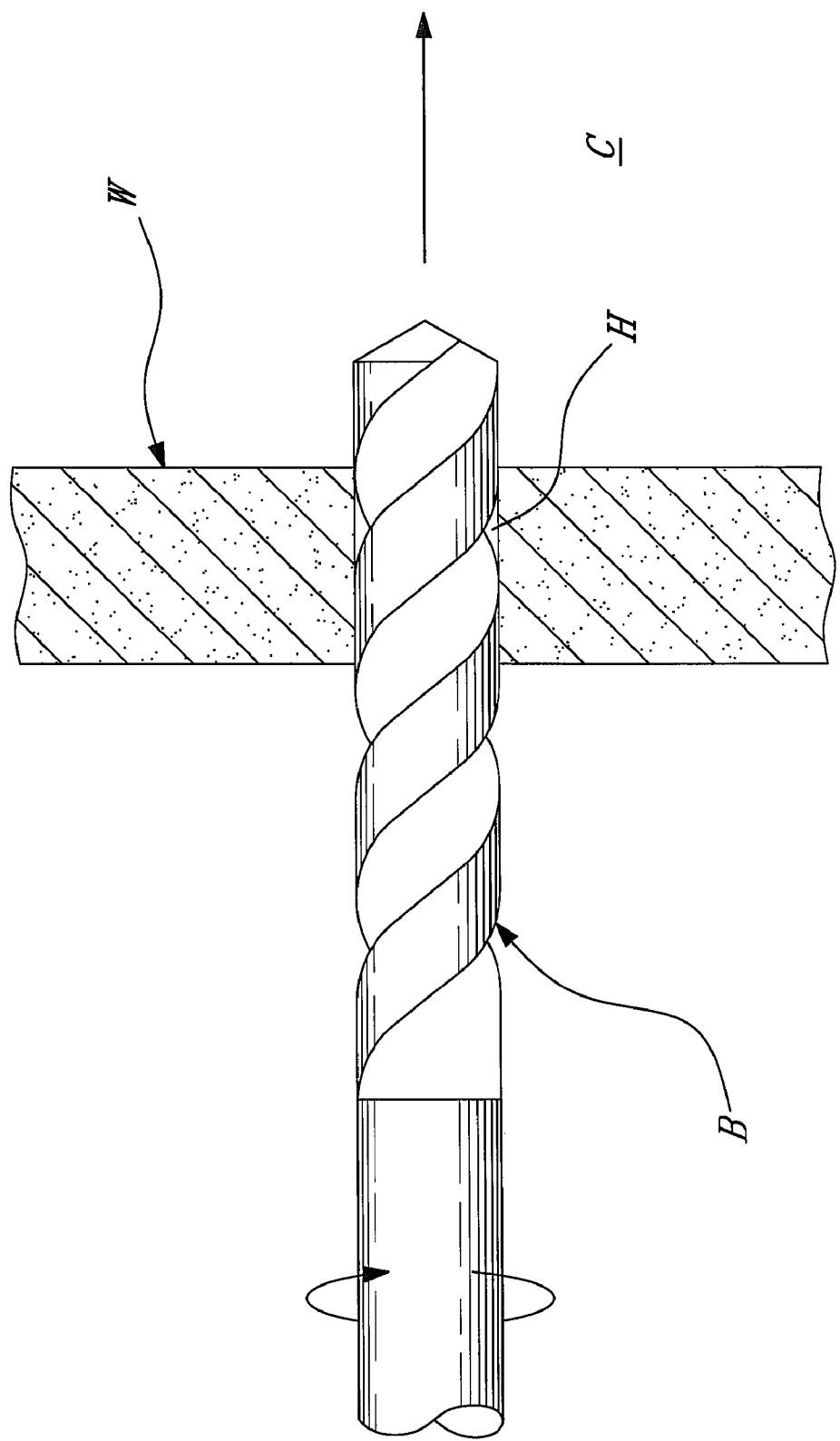
Figure 7B:
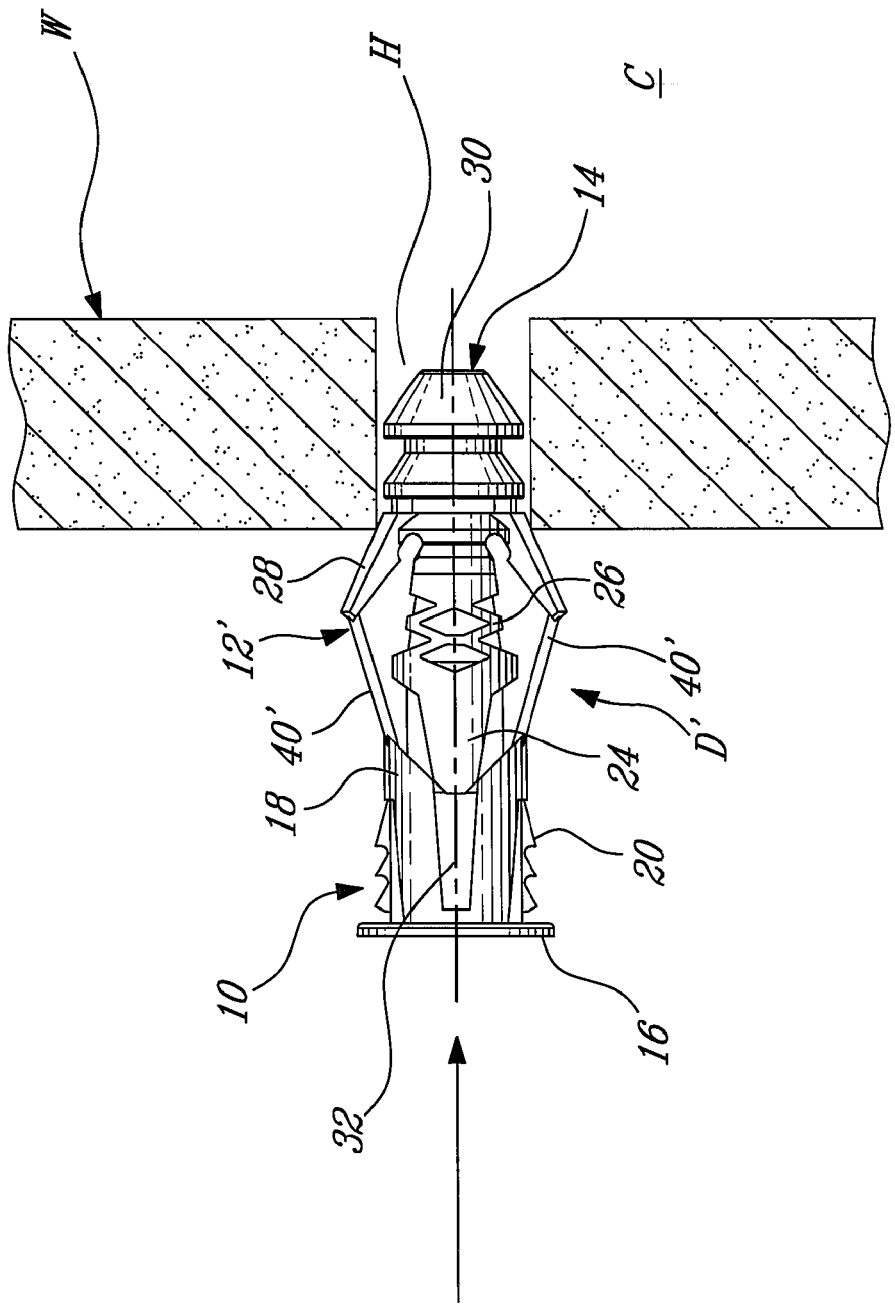
Figure 7C:
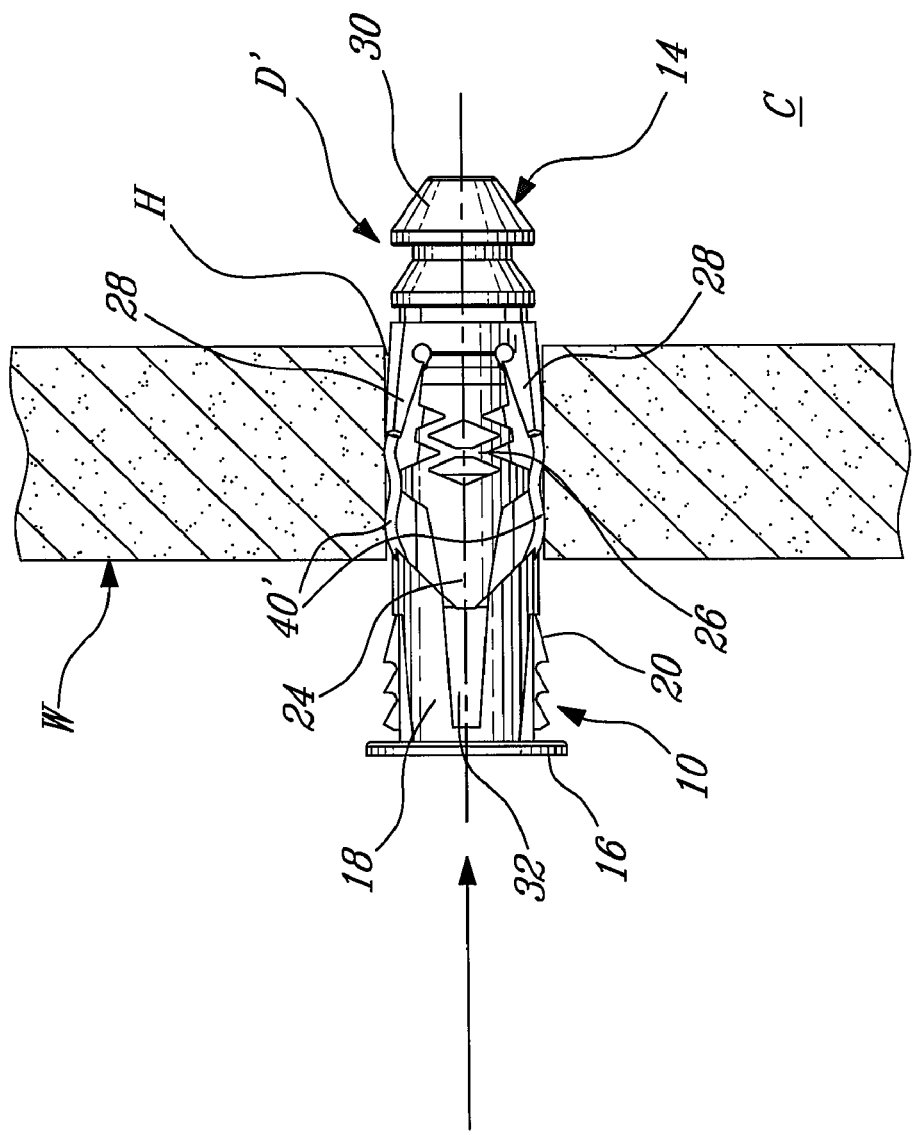
Figure 7D:
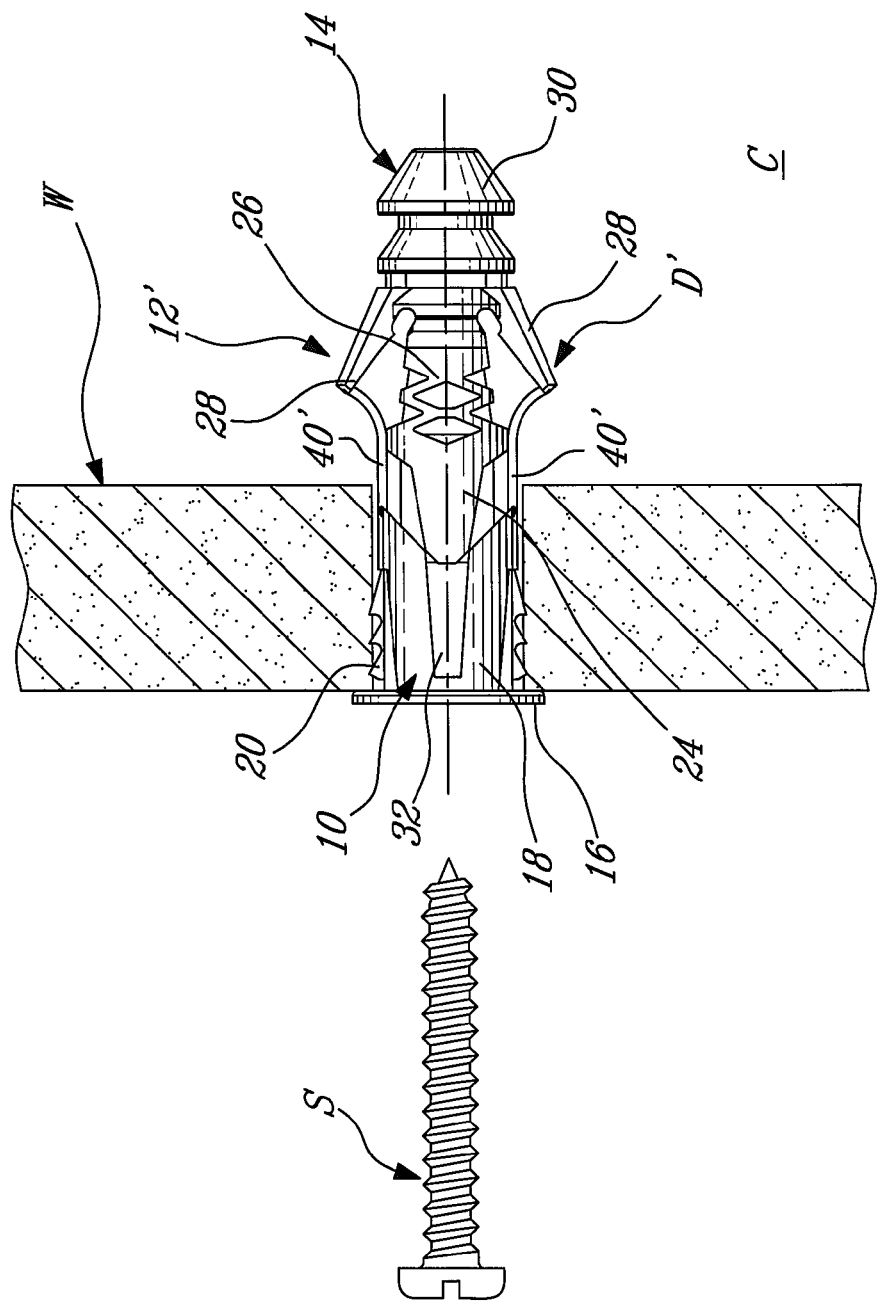

FIGS. 7a to 7h illustrate, in a number of sequential views, various steps for installing the anchoring device D' of FIG. 6 in a hollow wall W. In FIG. 7a, a drill bit B is used to form a hole H in the wall W. FIGS. 7b to 7d show the anchoring device D' being gradually pushed into the hole H, wherein in FIG. 7b, the tip 14 is engaged in the hole H; then, in FIG. 7c, the legs 18 and the retainer arms 40' are forced by the wall W to collapse towards one another; and subsequently, as seen in FIG. 7d, the legs 18 and the retainer arms 40' return, after having reached a cavity C behind the hollow wall W and under their bias, to their expanded position, while the teeth 20 of the racks 19 engage the wall material delimiting the hole H. FIG. 7d also shows a fastener, herein a screw S, prior to rotatably engaging the anchoring device D'. The engagement of the teeth 20 in the wall W will subsequently oppose a rotation of the anchoring device D' with respect to the wall W when the screw S is rotatably engaged therein.

Figure 7E:
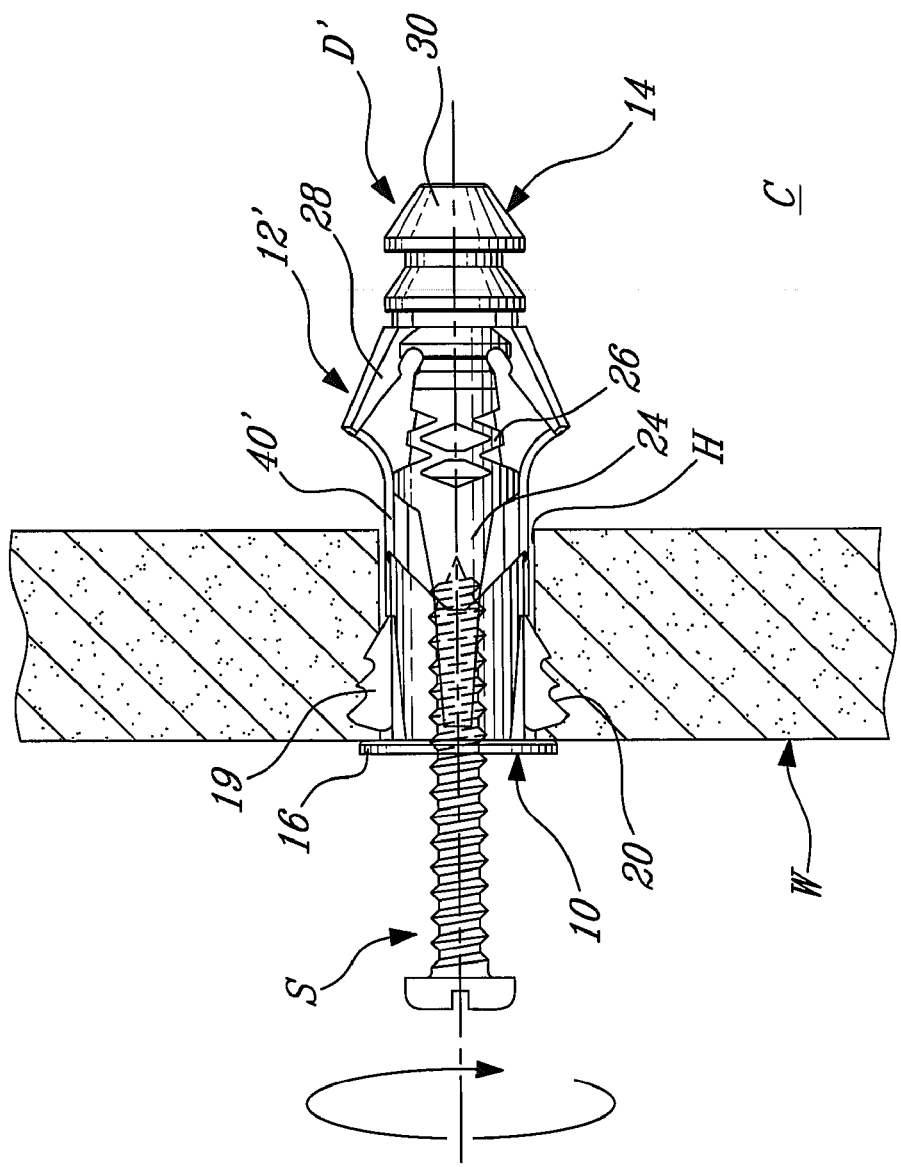
Figure 7F:
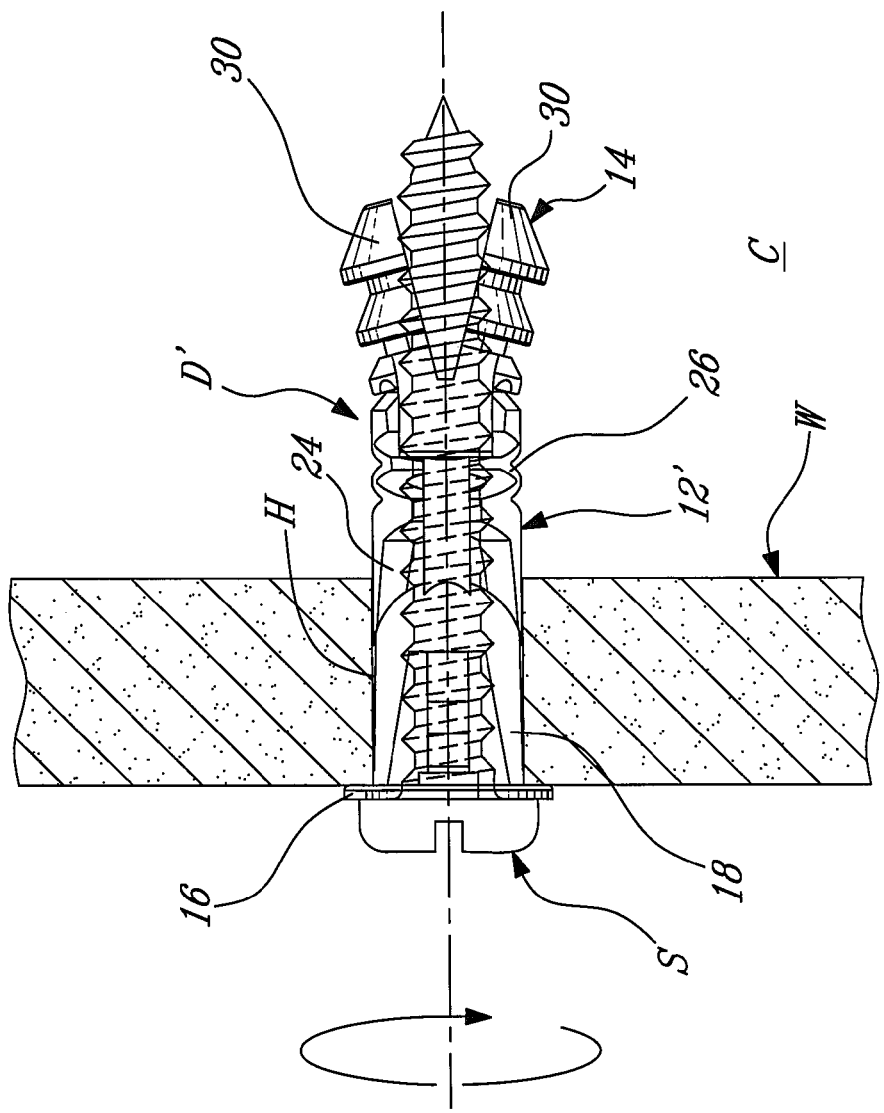

FIG. 7e illustrates the screw S engaged in the head section 10 of the anchoring device D', via the aperture 22 thereof. The screw S causes the racks 19 to pivotally expand outwardly such that the teeth 20 thereof engage more deeply and thus more strongly the wall material. In FIG. 7f (in which the anchoring device D' is shown rotated 90° relative to its position in FIGS. 7a to 7e, 7g and 7h), the screw S is fully inserted in the anchoring device D' thereby spreading the tips 30 of the tip section 14.

FIG. 7g is the result of a further rotation of the screw S. More particularly, in FIG. 7f, the threads of the screw S engaged female threads previously defined in the stem section 12' of the anchoring device D' or tapped such female threads in the stem section 12'. After the screw S has abutted the wall W, a further rotation of the screw S causes, as the screw S cannot further translationally advance, the stem section 12' to translationally withdraw towards the head section 10. This displacement of the stem section 12' (with the tip section 14 following) causes (1) the wings 28 to engage the hidden surface of the wall W (with the retainer arms 40' deforming) and (2) the wedge portions 24 of the stem section 12' to engage the slots 32 and forceably spread the legs 18 outwardly into the wall material.

Figure 7H:
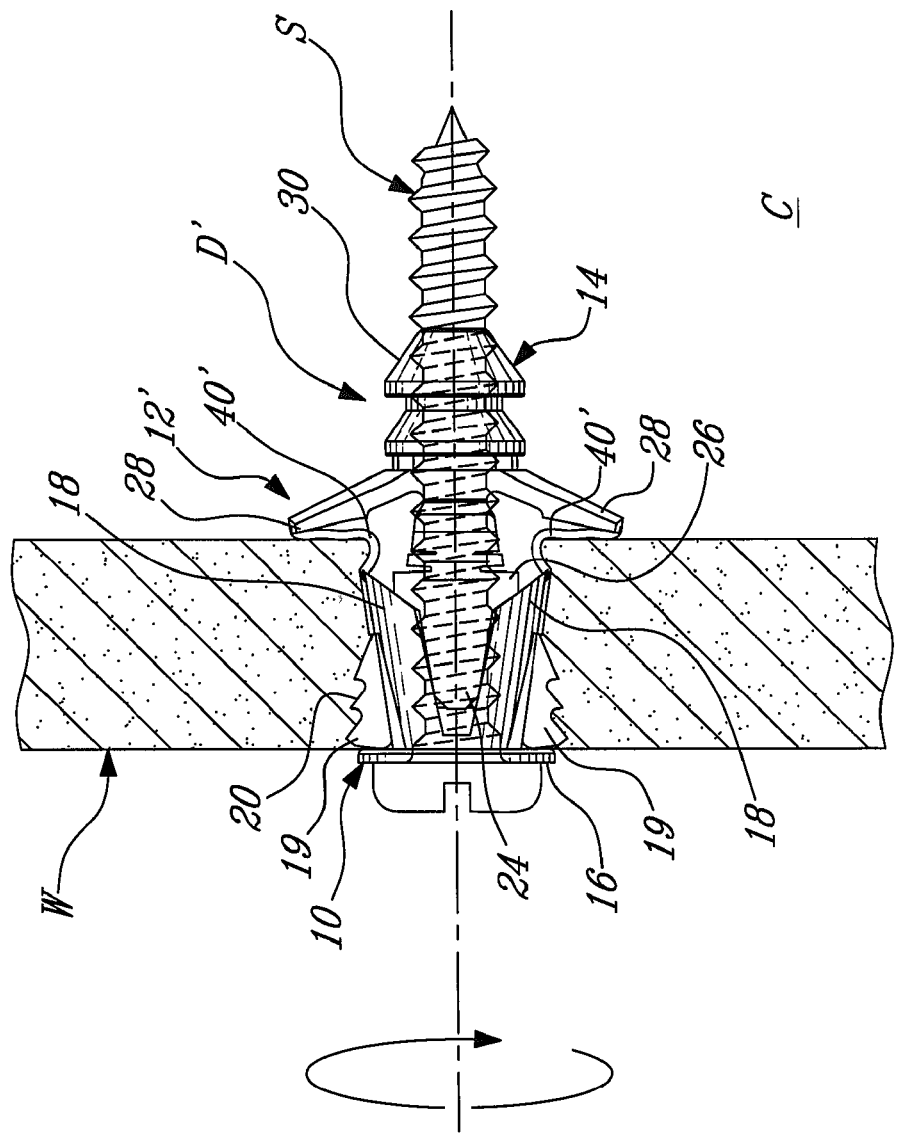

As seen in FIG. 7h, a still further rotation of the screw S can cause the stem section 12' to further withdraw, such that the wings 28 spread into a fuller engagement with the wall W, and with the flexible portion 26 possibly collapsing (shortening) to allow for the wings 28 to assume their shown position.

Figure 8:
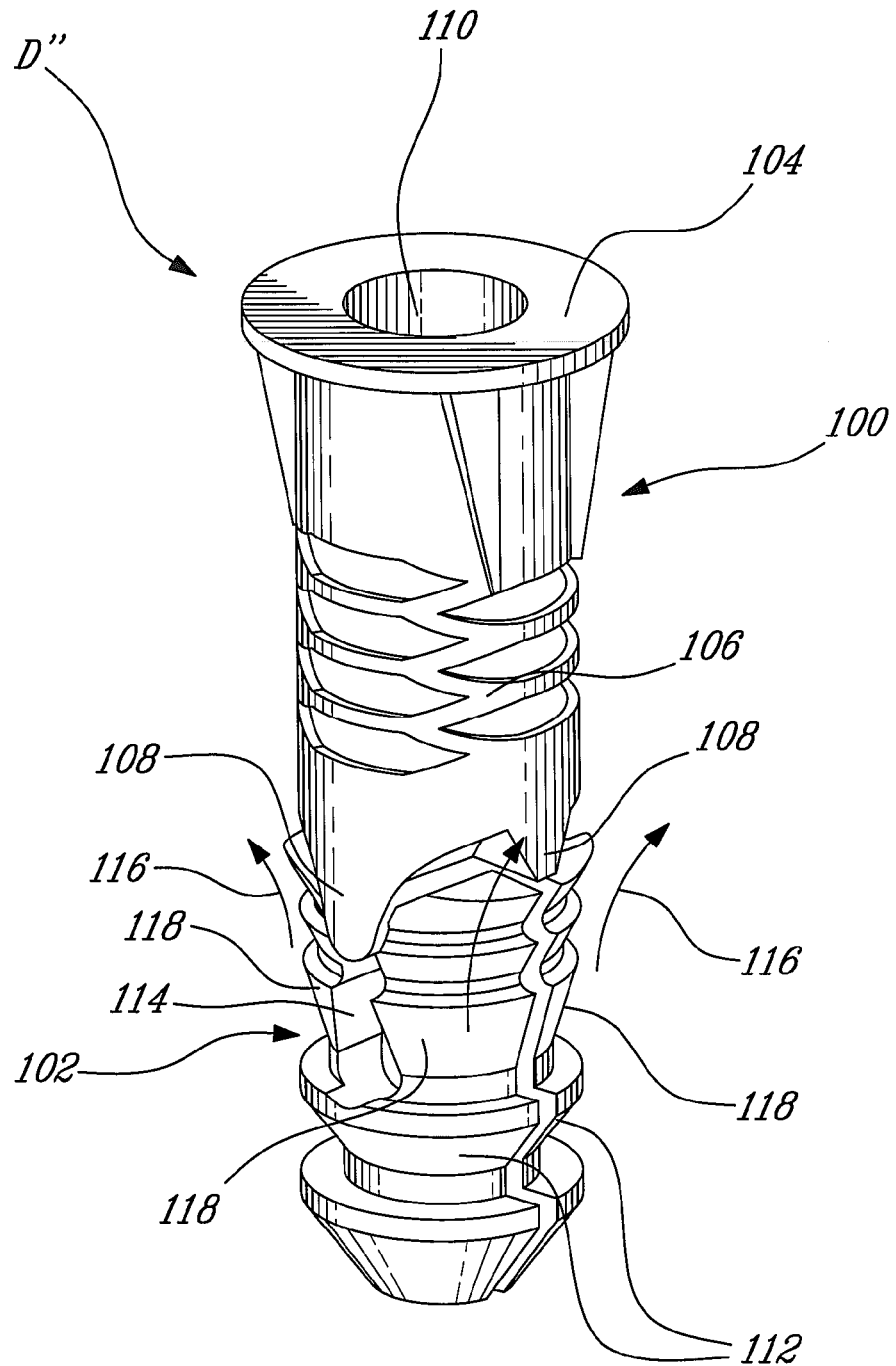
FIG. 8 is a perspective view of a third anchoring device in accordance with the present invention.

FIG. 8 illustrates a third anchoring device D" in accordance with the present invention, which includes a proximal section 100 and a distal section 102. The proximal section 100 comprises a flanged proximal end 104 adapted to abut a visible side of the wall (or other structure into which the anchoring device D" is intended to be installed), an intermediate portion 106 that defines openings so as to provide flexibility to the intermediate portion 106 (capable of limited extension and retraction along a longitudinal axis of the proximal section 100), and distal portion that includes wedges (four such wedges being provided herein) 108. The proximal section 100 also defines a central axial aperture 110 adapted to receive therethrough a fastener, such as a screw.

The distal section 102 includes a pair of symmetrical tips 112 adapted to expand, i.e. to spread away from one another, in hollow as well as in solid situations at the final stage of insertion of the fastener (screw). The distal section 102 further defines, in each tip 112, a slot 114, thereby providing four wings 118. In the case of hollow walls, the spread tips 112 add to the pull-out force required to rip the installed anchoring device D" from the wall. In solid walls, the tips 112, when spread outwardly, engage the wall material delimiting the pre-drilled hole thereby further retaining the anchoring device D" in the wall.

When the anchoring device D" is inserted in the pre-drilled hole, a strong internal cam mechanism will force the distal section 102 to ram into the proximal section 100 of the anchoring device D", with the wedges 108 displacing the wings 118 outwardly, i.e. from the inside to the outside, along arrows 116. This expansion of the wings 118 will wedge the anchoring device D" solidly into the pre-drilled hole in the case of the solid walls. In hollow wall situations, the wings 118 will expand behind the wall thereby creating a retention strength to increase the tension or the shear of the anchoring device D".

Although the present invention has been described hereinabove by way of specific embodiments thereof, it can be modified, without departing from the spirit and nature of the subject invention as defined in the appended claims.

We claim:

1. An anchoring device for insertion in a hole provided in a structure, the device comprising:
    a proximal section and a distal section disposed along a longitudinal anchor axis;
    the proximal section including a head portion defining an aperture for receiving a fastener and including at least one leg adapted to move between a retracted position and an expanded position, the leg, when in the expanded position, being adapted to radially exert pressure on a wall material delimiting the hole to secure the anchoring device within the hole;
    the distal section including a wedge and at least one expandable wing adapted to move between a retracted position and an expanded position, the distal section being adapted to longitudinally move toward the proximal section thereby causing the at least one expandable wing to engage the structure in the expanded position thereof and also causing the wedge to displace the leg from the retracted position to the expanded position thereof for securing the anchoring device within the hole, wherein the distal section includes a flexible portion disposed between the wedge and the at least one expandable wing.

2. The anchoring device of claim 1, wherein the head portion comprises a flange adapted to prevent the head portion from moving into the hole.

3. The anchoring device of claim 1, wherein the distal section includes a tip portion, disposed distally from at least one expandable wing.

4. The anchoring device of claim 3, wherein the tip portion comprises at least two separable tips adapted to be radially spread from one another to engage the structure when the fastener is forced therebetween.

5. The anchoring device of claim 1, wherein the at least one leg comprises a tooth adapted to increase the friction between the at least one leg and an internal surface of the hole to further secure the anchoring device within the hole.

6. The anchoring device of claim 1, wherein the at least one expandable wing, when in the expanded position, is adapted to engage a distal surface of the structure to further secure the anchoring device to the structure.

7. The anchoring device of claim 1, wherein the fastener engages the aperture and to treadably engage the distal section such that rotation of the fastener is adapted to retract the distal section toward the proximal section.

8. The anchoring device of claim 1, wherein the fastener is adapted to cause the at least one leg and the at least one expandable wing to engage the structure.

9. The anchoring device of claim 1, wherein there are provided at least two expandable wings disposed in diametrically opposed positions.

10. The anchoring device of claim 1, wherein the at least one wing extends at an angle toward the proximal section.

11. The anchoring device of claim 1, wherein there are provided at least two legs disposed in diametrically opposed positions.

12. The anchoring device of claim 11, wherein there are provided two wedges disposed in diametrically opposed positions and opposite gaps defined between the legs.

13. The anchoring device of claim 1, wherein each of the at least one leg comprises one retention member, the retention member being adapted, when the fastener is engaged in the proximal section, to move outwardly into engagement with the structure.

* * * * *

UNITED STATES PATENT AND TRADEMARK OFFICE
CERTIFICATE OF CORRECTION

PATENT NO.         : 7,600,956 B2
APPLICATION NO. : 11/385975
DATED              : October 13, 2009
INVENTOR(S)        : Pierre McDuff Page 1 of 1

It is certified that error appears in the above-identified patent and that said Letters Patent is hereby corrected as shown below:

Title page, item [73] should read as follows:

Assignee: *Cobra Fixations Cie Ltée-Cobra Anchors Co. Ltd.*

Signed and Sealed this

Twenty-fourth Day of November, 2009

David J. Kappos
*Director of the United States Patent and Trademark Office*